United States Patent
Kasahara et al.

(10) Patent No.: US 7,741,256 B2
(45) Date of Patent: Jun. 22, 2010

(54) LUBRICANT COMPOSITION, EXPANDABLE SHAFT, AND STEERING SYSTEM USING THE SAME

(75) Inventors: Fumiaki Kasahara, Kashiwara (JP); Satoshi Kakutani, Kashihara (JP); Kazuto Minagawa, Nara (JP)

(73) Assignee: JTEKT Corporation, Osaka (JP)

( * ) Notice: Subject to any disclaimer, the term of this patent is extended or adjusted under 35 U.S.C. 154(b) by 513 days.

(21) Appl. No.: 11/715,507

(22) Filed: Mar. 8, 2007

(65) Prior Publication Data

US 2007/0209863 A1     Sep. 13, 2007

(30) Foreign Application Priority Data

Mar. 8, 2006     (JP)     ............................. 2006-063178

(51) Int. Cl.
  *C10M 113/00*     (2006.01)
  *C10M 115/00*     (2006.01)
  *C10M 107/02*     (2006.01)

(52) U.S. Cl. .......................... 508/181; 508/110; 585/10

(58) Field of Classification Search ................. 508/181, 508/110; 585/10

See application file for complete search history.

(56) References Cited

U.S. PATENT DOCUMENTS

| | | | | |
|---|---|---|---|---|
| 4,472,290 | A  * | 9/1984 | Caporiccio et al. | 508/181 |
| 6,010,984 | A  * | 1/2000 | Heimann et al. | 508/136 |
| 6,025,307 | A  * | 2/2000 | Chittofrati et al. | 508/182 |
| 6,323,161 | B1 * | 11/2001 | Cha | 508/138 |
| 6,343,993 | B1 | 2/2002 | Duval et al. | |
| 6,905,248 | B2 * | 6/2005 | Katagiri et al. | 384/462 |
| 2005/0075250 | A1 * | 4/2005 | MaCcone et al. | 508/182 |

FOREIGN PATENT DOCUMENTS

| | | | |
|---|---|---|---|
| JP | 10-273684 | | 10/1998 |
| JP | 2001-050293 | | 2/2001 |
| JP | 2004276725 | A  * | 10/2004 |

* cited by examiner

*Primary Examiner*—Glenn A Caldarola
*Assistant Examiner*—Pamela Weiss
(74) *Attorney, Agent, or Firm*—Rabin & Berdo, PC

(57) ABSTRACT

A lubricant composition contains poly-α-olefin oil having a kinematic viscosity of 1500 to 13000 mm$^2$/s (40° C.) as a base oil and from 45 to 50% by weight of a thickener composed of polytetrafluoroethylene. The lubricant composition may be used for lubricating an expandable shaft having a pair of shaft members filled with the lubricant composition to prevent stick-slip from occurring when a high surface pressure is applied thereto, thereby allowing consistent maintenance of good lubricating performance. Such an expandable shaft may be incorporated advantageously into a steering system as an intermediate shaft into an area between a steering shaft and a rack-and-pinion mechanism.

1 Claim, 3 Drawing Sheets

LUBRICANT COMPOSITION, EXPANDABLE SHAFT, AND STEERING SYSTEM USING THE SAME

BACKGROUND OF THE INVENTION

1. Field of the Invention

The present invention relates to a lubricant composition suited to lubricate an expandable shaft comprising a pair of shaft members axially expandable and contractible and coupled to each other to be integrally rotatable in a direction of rotation around its axis to fill an area between both the shaft members, the expandable shaft, and a steering system incorporating the expandable shaft.

2. Description of Related Art

Examples of EPS (Electric Power Steering System) for automobiles include column-type EPS utilizing a rotary force of an electric motor provided on a column. In the column-type EPS, an expandable shaft comprising a pair of shaft members axially expandable and contractible and coupled to each other to be integrally rotatable in a direction of rotation around its axis has spread as an intermediate shaft for connecting a steering shaft connected to a steering wheel serving as a steering member and a steering mechanism such as a rack-and-pinion mechanism.

In the column-type EPS, the distance between the steering shaft and the steering mechanism is arbitrarily changed when the expandable shaft is assembled into an automobile utilizing an expanding/contracting function of the expandable shaft, to improve assembling workability and absorb relative displacement between the steering shaft and the steering mechanism when the automobile is traveling.

As a coupling structure of the expandable shaft, a spline or a serration is generally employed. For example, the expandable shaft is configured by forming a male spline (external spline) at an end of one of the pair of shaft members (inner shaft member) and forming a cylindrical female spline (internal spline) into which the male spline is inserted at an end of the other shaft member (outer shaft member), and inserting the male spline into the female spline to couple both the shaft members to be axially expandable and contractible and integrally rotatable in the direction of rotation around the axis.

In this case, the expandable shaft cannot be assembled by inserting the male spline into the female spline if there is no clearance between the splines. When a clearance is provided, as disclosed in paragraphs [0002] to [0005] in Japanese Unexamined Patent Publication No. JP2001-50293A, however, both the shaft members are relatively displaced in a radial direction and a circumferential direction to produce a rattle sound, which makes a driver uncomfortable.

Therefore, a surface of at least one of both the splines is subjected to resin coating to reduce the clearance as small as possible, and the clearance is filled with a lubricant composition such as grease. In recent years as the column-type EPS has found wider applications to cars of large displacement, and, a load (torsional rigidity) applied to the steering column has tended to increase at the time of steering. Therefore, a higher surface pressure than before is applied between both the splines. If normal grease is used for lubricating the expandable shaft, stick-slip due to oil film shortage occurs, which causes a new problem of making a driver uncomfortable, by a slip sound easily produced particularly when the steering wheel is returned.

SUMMARY OF THE INVENTION

An object of the present invention is to provide a lubricant composition used for lubricating an expandable shaft to prevent stick-slip from occurring when a high surface pressure is applied thereto, thereby allowing to maintain a good lubricating performance consistently, an expandable shaft comprising a pair of shaft members filled with the lubricant composition, and a steering system using the expandable shaft as an intermediate shaft.

The present invention is directed to a lubricant composition for lubricating an expandable shaft comprising a pair of shaft members axially expandable and contractible and coupled to each other to be integrally rotatable in a direction of rotation around its axis to fill an area between both the shaft members, containing a base oil having a kinematic viscosity of 1500 to 13000 mm$^2$/s (40° C.) and polytetrafluoroethylene serving as a thickener. It is preferable that the content of the polytetrafluoroethylene in the lubricant composition is 20 to 50% by weight.

An expandable shaft according to the present invention comprises a pair of shaft members axially expandable and contractible and coupled to each other to be integrally rotatable in a direction of rotation around its axis, and wherein an area between both the shaft members is filled with the lubricant composition according to the present invention.

Furthermore, a steering system according to the present invention comprises a steering member, a steering shaft connected to the steering member, the expandable shaft according to the present invention, serving as an intermediate shaft, connected to the steering shaft, and a steering mechanism including an input shaft connected to the expandable shaft for turning a steerable wheel by the rotation of the input shaft.

According to the present invention, the kinematic viscosity of the base oil is limited to 1500 mm$^2$/s or more at 40° C., and the polytetrafluoroethylene (PTFE) also serving as a solid lubricant is used as a thickener. Therefore, the lubricant composition is used for lubricating the expandable shaft, to make it difficult to cause oil film shortage when a high surface pressure is applied thereto as well as to make it possible to prevent stick-slip from occurring when the oil film shortage occurs. Further, since the kinematic viscosity of the base oil is limited to 13000 mm$^2$/s or less at 40° C., which also prevents a sliding load from being too high such as in a case where the expandable shaft is incorporated as an intermediate shaft into a column-type EPS while expanding and contracting the expandable shaft to change the distance between the steering shaft and the steering mechanism, whereby the workability in assembling the column-type EPS into an automobile is also improved.

The foregoing and other objects, features, aspects and advantages of the present invention will become more apparent from the following detailed description of the present invention when taken in conjunction with the accompanying drawings.

Figure 1:
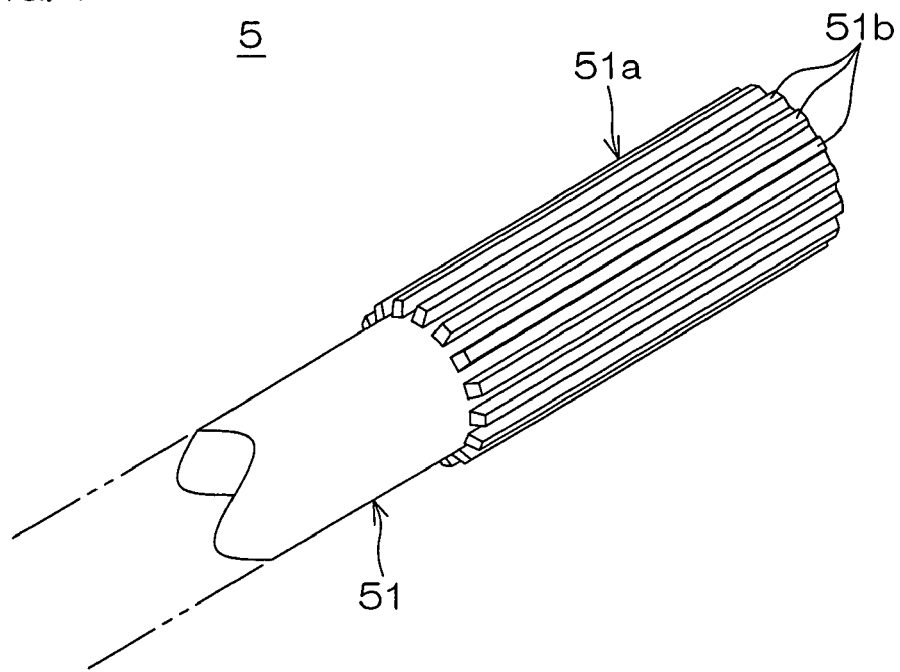
FIG. 1 is a perspective view showing a male spline provided at an end of an inner shaft member constituting an expandable shaft as an example of an embodiment of the present invention.

DETAILED DESCRIPTION OF THE PREFERRED EMBODIMENT (Lubricant Composition)

A lubricant composition according to the present invention contains a base oil having a kinematic viscosity of 1500 to 13000 $mm^2/s$ (40° C.) and a PTFE (polytetrafluoroethylene) serving as a thickener. In the present invention, the following is the reason why the kinematic viscosity of the base oil at 40° C. is limited to 1500 to 13000 $mm^2/s$.

Specifically, when the kinematic viscosity of the base oil at 40° C. is less than 1500 $mm^2/s$, the viscosity of the lubricant composition is too low. If the lubricant composition is used for lubricating an expandable shaft, therefore, stick-slip due to oil film shortage cannot be prevented from occurring when a high surface pressure is applied thereto irrespective of the fact that the PTFE is contained as a thickener.

On the other hand, when the kinematic viscosity of the base oil at 40° C. is more than 13000 $mm^2/s$, the viscosity of the lubricant composition is too high. Therefore, a sliding load is too high, in such a case where the expandable shaft is incorporated as an intermediate shaft into a column-type EPS while expanding and contracting the expandable shaft to change the distance between a steering shaft and a steering mechanism, whereby the workability in assembling the column-type EPS into an automobile is deteriorated. In the worst case, the assembling work cannot be manually performed.

If the kinematic viscosity of the base oil is set to 1500 to 13000 $mm^2/s$, stick-slip due to oil film shortage can be prevented from occurring by a combination with the use of PTFE as a thickener, which is described before, also serving as a solid lubricant. Further, it is possible to improve the workability in assembling a column-type EPS into an automobile if the expandable shaft is incorporated into the column-type EPS as an intermediate shaft while expanding and contracting the expandable shaft to change the distance between a steering shaft and a steering mechanism. Considering that the stick-slip due to oil film shortage is more reliably prevented from occurring and the workability in assembling the column-type EPS into the automobile is further improved, it is preferable that the kinematic viscosity of the base oil is particularly 2000 to 7500 $mm^2/s$ within the above-mentioned range.

As the base oil, various types of base oils are usable having a kinematic viscosity within the above-mentioned range out of various types of conventionally known base oils. Examples include synthetic oils and mineral oils, and the synthetic oils include synthetic hydrocarbon oil, silicone oil, fluorine oil, ester oil, and ether oil. In a case where a surface of at least one of a male spline and a female spline is subjected to resin coating, synthetic hydrocarbon oil having low attackability against the resin coating is preferable. Particularly, poly-α-olefin oil is suitably used.

A PTFE is used as the thickener. When a thickener other than the PTFE, for example, metal soap thickeners, are used, the effect of preventing stick-slip due to oil film shortage from occurring cannot be obtained even if the viscosity of the base oil is within the above-mentioned range. The reason for this is that the thickener other than the PTFE does not serve as a solid lubricant. However, in a range in which the above-mentioned effect produced by mixing the PTFE as the thickener is not prevented, that is, out of the a range in which the effect of preventing stick-slip due to oil film shortage from occurring cannot be obtained because the content of PTFE in the total amount of the thickener is too low in order to obtain a lubricant composition having predetermined viscosity characteristics (consistency or the like), the other thickener can be used with the PTFE.

Any of the products of various grades can be employed that is usable as a thickener obtained by dispersing very small spherical PTFE fine particles in any organic solvent. It is preferable that the content of the PTFE serving as a thickener is 20 to 50% by weight, particularly 45 to 50% by weight in the total amount of the lubricant composition. When the content of the PTFE is less than the above-mentioned range, the effect of preventing stick-slip due to oil film shortage by mixing the PTFE may not be sufficiently obtained. Conversely, when the content of the PTFE is more than the above-mentioned range, a sliding load is too high, such as in a case where the expandable shaft is incorporated as an intermediate shaft into a column-type EPS while expanding and contracting the expandable shaft to change the distance between the steering shaft and the steering mechanism, whereby the workability in assembling the column-type EPS into an automobile may be deteriorated.

The lubricant composition according to the present invention may be further added with a solid lubricant such as molybdenum disulfide and graphite, extreme-pressure additive containing phosphorous, sulfur, etc., oxidation inhibitor such as tributyl phenol and methyl phenol, rust inhibitor, metal deactivator, viscosity index improver, and oil agent as required. It is preferable that the consistency of the lubricant composition is No.2 to No.00, particularly No.2 to No.1 in terms of an NLGI (National Lubricating Grease Institute) number.

(Expandable Shaft)

An expandable shaft according to the present invention comprises a pair of shaft members axially expandable and contractible and coupled to each other to be integrally rotatable in a direction of rotation around its axis, wherein an area between both the shaft members is filled with the lubricant composition according to the present invention. As the expandable shaft itself, ones having various configurations conventionally known are employable.

Figure 2:
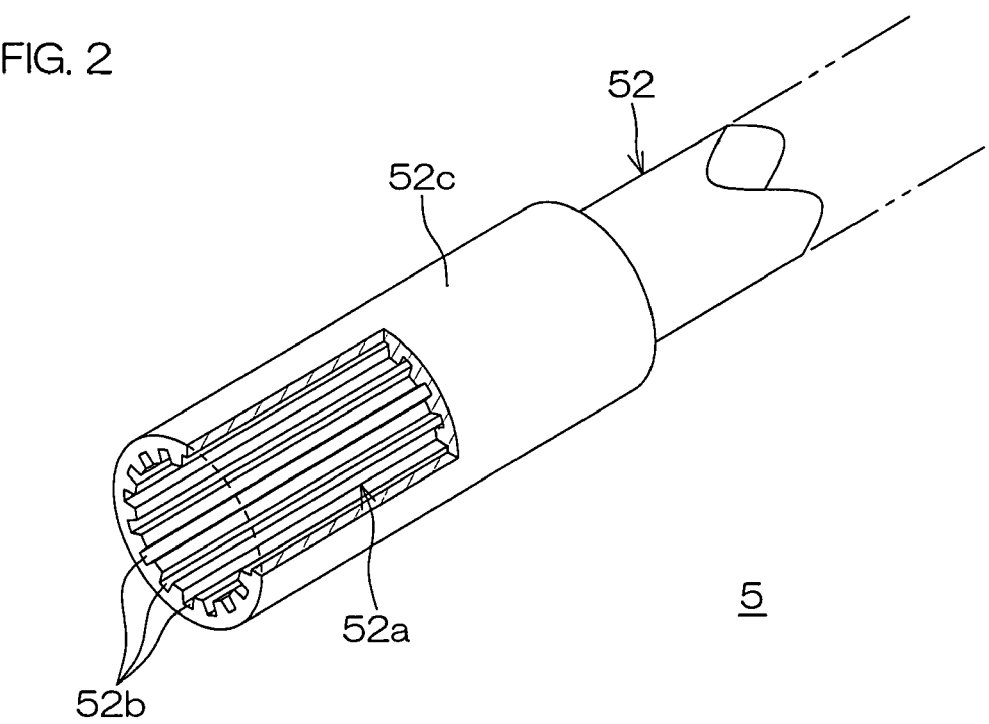
FIG. 2 is a partially cutaway perspective view showing a cylindrical female spline provided at an end of an outer shaft member, together with the inner shaft member, constituting the expandable shaft.

FIG. 1 is a perspective view showing a male spline 51*a* provided at an end of an inner shaft member 51 constituting an expandable shaft 5 as an example of an embodiment of the present invention. FIG. 2 is a partially cutaway perspective view showing a cylindrical female spline 52*a* provided at an end of an outer shaft member 52, together with the inner shaft member 51, constituting the expandable shaft 5.

Referring to FIG. 1, on an outer peripheral surface at an end of the inner shaft member 51 connected to the outer shaft member 52, many keys 51*b* are projected parallel to the axial direction of the inner shaft member 51 and with equal spacing in a circumferential direction radially outward from the outer peripheral surface to constitute the male spline 51*a*. Referring to FIG. 2, the outer shaft member 52 has an end portion 52*c*, which is connected to the inner shaft member 51 and formed in the shape of a cylinder into which the male spline 51*a* is inserted. On an inner peripheral surface of the cylinder, many key grooves 52*b*, which are meshed with the keys 51*b* of the male spline 51*a*, are recessed parallel to the axial direction of the outer shaft member 52 and with equal spacing in a circumferential direction radially inward from the inner peripheral surface to constitute the female spline 52*a*.

Both the shaft members 51 and 52 are connected to each other so as to be axially expandable and contractible and such that power is transmittable in the direction of rotation around the axis by inserting the male spline 51*a* into the female spline 52*a* while meshing the keys 51*b* of the male spline 51*a* with the key grooves 52*b* of the female spline 52*a*.

A clearance is set, as in the prior art, in a meshing portion between the keys 51*b* of the male spline 51*a* and the key grooves 52*b* of the female spline 52*a*. In order to reduce the clearance as small as possible, it is preferable that a surface of at least one of the male spline 51*a* and the female spline 52*a* is subjected to resin coating, as in the prior art. Examples of resin forming the resin coating include thermoplastic resins having oil resistance such as nylon resins, olefin resins, fluorine resins, and polyester resins, and thermosetting resins such as epoxy resins, phenol resins, thermosetting polyester resins, and thermosetting acrylic resins.

Examples of the nylon resins include PA6, PA66, PA46, PA11, and PA12. In addition, aromatic polyamide represented by PPA (polyphthalamide) can be also used. Examples of the olefin resins include PE (polyethylene) such as HDPE (high density polyethylene) and UHDPE (ultrahigh density polyethylene) and PP (polypropylene). Examples of the fluorine resins include PTFE (polytetrafluoroetylene), PFA (tetrafluoroethylene-perfluoroalkylvinyl ether copolymer), FEP (tetrafluoroethylene-hexafluoropropylene copolymer), and ETFE (tetrafluoroethylene-ethylene copolymer). Examples of the polyester resins include PET (polyethylene terephthalate) and PBT (polybutylene terephthalate). Solid lubricants such as PE (polyethylene), PTFE (polytetrafluoroethylene), and MoS$_2$ (molybdenum disulfide), and fillers such as calcium carbonate and talc may be added to the resins.

The meshing portion between the keys 51*b* of the male spline 51*a* and the key grooves 52*b* of the female spline 52*a* is filled with the lubricant composition according to the present invention, to lubricate the expandable shaft 5.

The function of the lubricant composition according to the present invention with which the meshing portion is filled prevents a sliding load from being too high such as in a case where the expandable shaft is incorporated as an intermediate shaft into a column-type EPS while expanding and contracting the expandable shaft to change the distance between the steering shaft and the steering mechanism, whereby the workability of the work can be improved. Even if a high surface pressure is applied to the meshing portion between the keys 51*b* of the male spline 51*a* and the key grooves 52*b* of the female spline 52*a* at the time of steering of the column-type EPS after the assembling, there occurs no stick-slip due to oil film shortage, which can prevent a slip sound from being produced to make a driver uncomfortable particularly such as in a case where the steering wheel is returned. The configuration of the expandable shaft according to the present invention is suitably applicable to the intermediate shaft in the column-type EPS. In addition thereto, it is also applicable to the steering shaft in the same column-type EPS, for example.

(Steering System)

Figure 3:
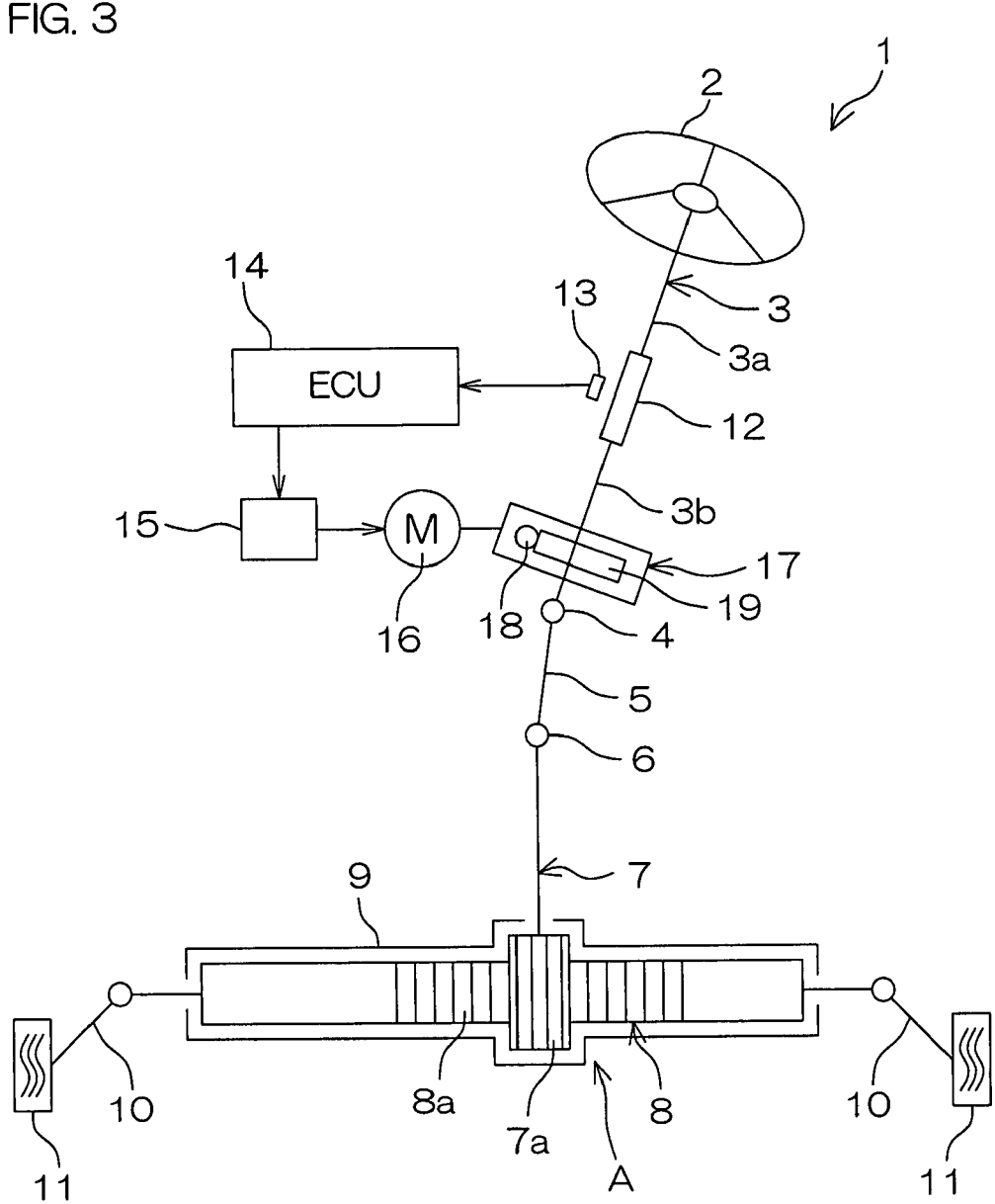
FIG. 3 is a schematic view showing the configuration of a column-type EPS as an example of an embodiment of a steering system according to the present invention.

FIG. 3 is a schematic view showing the configuration of a column-type EPS 1 as an example of an embodiment of a steering system according to the present invention. Referring to FIG. 3, the column-type EPS 1 has a steering shaft 3 connected to a steering wheel 2 serving as a steering member, an intermediate shaft 5 connected to the steering shaft 3 through a universal joint 4, a pinion shaft 7 serving as an input shaft connected to the intermediate shaft 5 through a universal joint 6, and a rack bar 8 having rack teeth 8*a* meshed with pinion teeth 7*a* provided in the vicinity of an end of the pinion shaft 7 and extending along the right and left of an automobile. The pinion shaft 7 and the rack bar 8 constitute a rack-and-pinion mechanism A serving as a steering mechanism.

The rack bar 8 is supported so as to be linearly movable right and left through a plurality of bearings (not shown) within a housing 9 fixed to a vehicle body. Both ends of the rack bar 8 are projected toward both the sides of the housing 9, and a tie rod 10 is coupled to each of the projected ends. Each of the tie rods 10 is connected to a corresponding steerable wheel 11 through a corresponding knuckle arm (not shown). When the steering wheel 2 is operated to rotate the steering shaft 3, the rotation is converted into the linear motion of the rack bar 8 along the right and left of the automobile by the pinion teeth 7*a* and the rack teeth 8*a* to turn the steerable wheel 11.

The steering shaft 3 is divided into an upper shaft 3*a* on the input side communicating with the steering wheel 2 and a lower shaft 3*b* on the output side communicating with the pinion shaft 7. Both the shafts 3*a* and 3*b* are connected to each other so as to be relatively rotatable on the same axis through a torsion bar 12. The torsion bar 12 is provided with a torque sensor 13 for detecting a steering torque from a displacement amount of relative rotation between both the shafts 3*a* and 3*b*. The results of the detection of the torque by the torque sensor 13 are given to an ECU (Electric Control Unit) 14.

The ECU 14 controls the driving of an electric motor 16 for steering assist through a driving circuit 15 on the basis of the results such as the detection of the torque and the detection of vehicle speed given from a vehicle speed sensor (not shown), for example. The output rotation of the electric motor 16 is reduced through a speed reduction gear 17, is transmitted to the pinion shaft 7, and is converted into the linear motion of the rack bar 8 to assist steering. The speed reduction gear 17 comprises a worm shaft (pinion) 18 serving as an input shaft whose rotation is driven by the electric motor 16, and a worm wheel (wheel) 19 meshed with the worm shaft 18 and connected to the lower shaft 3*b* in the steering shaft 3 so as to be integrally rotatable.

The column-type EPS 1 serving as the steering system according to the present invention is configured by incorporating the expandable shaft according to the present invention as the intermediate shaft 5. In this column-type EPS, a sliding load is not too high such as in a case where the expandable shaft is incorporated as an intermediate shaft into a column-type EPS while expanding and contracting the expandable shaft to change the distance between the steering shaft 3 and the steering mechanism, whereby the workability of the work can be improved. Even if a high surface pressure is applied to the meshing portion between the keys 51*b* of the male spline 51*a* and the key grooves 52*b* of the female spline 52*a* at the time of steering of the column-type EPS after the assembling, there occurs no stick-slip due to oil film shortage, which can prevent a slip sound from being produced to make a driver uncomfortable particularly such as in a case where the steering wheel 2 is returned.

The configuration of the present invention is not limited to that described above. For example, the expandable shaft is not limited to that using meshing between the male spline 51*a* and the female spline 52*a*, as shown in FIGS. 1 and 2. For example, the expandable shaft may employ a so-called ball spline-type configuration in which rolling grooves in an axial direction are respectively formed on an outer peripheral surface of an inner shaft member and an inner peripheral surface of an outer shaft member, a plurality of balls are disposed so as to be turnable in each of the grooves, and both the shaft members are coupled to each other through the balls so as to be axially expandable and contractible and integrally rotatable in a direction of rotation around its axis.

Even in this case, the rolling groove is filled with the lubricant composition according to the present invention to lubricate an area between the rolling groove and the balls, which can prevent stick-slip due to oil film shortage from occurring therebetween, and makes it possible to improve the workability in assembling a column-type EPS into an automobile if the expandable shaft is incorporated into the column-type EPS as an intermediate shaft while expanding and contracting the expandable shaft to change the distance between a steering shaft and a steering mechanism.

The steering system into which the expandable shaft according to the present invention is incorporated as an intermediate shaft is not limited to the column-type EPS 1 shown in FIG. 3. For example, it may be an EPS of another type and a normal steering system having no steering assisting function. In addition, various design changes can be made without departing from the scope of the present invention.

EXAMPLES

Examples 1 to 5

Lubricant compositions in Examples 1 to 5 were prepared using poly-α-olein oils having kinematic viscosities of 1500 mm$^2$/s (Example 1), 2054 mm$^2$/s (Example 2), 5548 mm$^2$/s (Example 3), 7414 mm$^2$/s (Example 4), and 12500 mm$^2$/s (Example 5) at 40° C., respectively as base oils and PTFE as thickeners. Both the components were mixed such that the content of PTFE was 45% by weight.

Comparative Examples 1 and 2

Lubricant compositions in Comparative Examples 1 and 2 were prepared using poly-α-olein oils having kinematic viscosities of 1000 mm$^2$/s (Comparative Example 1) and 13340 mm$^2$/s (Comparative Example 2) at 40° C., respectively as base oils and PTFE as thickeners. Both the components were mixed such that the content of PTFE was 45% by weight.

Comparative Example 3

A lubricant composition in Comparative Example 3 was prepared using a poly-α-olein oil having a kinematic viscosity of 3500 mm$^2$/s at 40° C. as a base oil and silica as a thickener. Both the components were mixed such that the content of silica was 30% by weight.

Comparative Example 4

A lubricant composition in Comparative Example 4 was prepared using a poly-α-olein oil having a kinematic viscosity of 5000 mm$^2$/s at 40° C. as a base oil and Li soap thickener as a thickener. Both the components were mixed such that the content of the Li soap thickener was 10% by weight.

(Characteristic Test)

Figure 4:
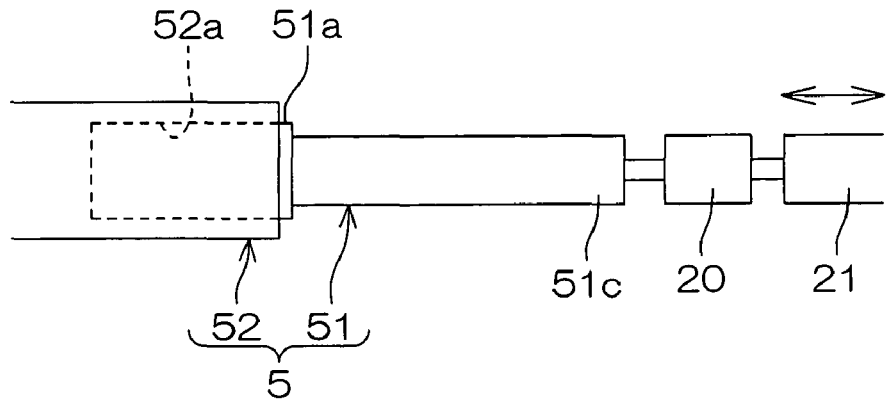
FIG. 4 is a schematic view showing a test device used for evaluating the characteristics of a lubricant composition prepared in each example and comparative example.

FIG. 4 is a schematic view showing a test device used for evaluating the characteristics of the lubricant composition prepared in each of the Examples and the Comparative Examples. Referring to FIG. 4, the test device is so adapted that the inner shaft member 51 and the outer shaft member 52 that constitute the expandable shaft 5 are connected to each other with the meshing portion between the male spline 51a and the female spline 52a in a state of being filled with the lubricant composition prepared in each of the Examples and the Comparative Examples, an end 51c on the opposite side of a portion where the male spline 51a is provided of the inner shaft member 51 is connected to the driving shaft 21 that is axially movable back and forth indicated by a solid line arrow through a torque meter 20, and the outer shaft member 52 is connected to a torque load member (not shown) that is rotatable in a direction of rotation around the central axis of the driving shaft 21.

Figure 5:
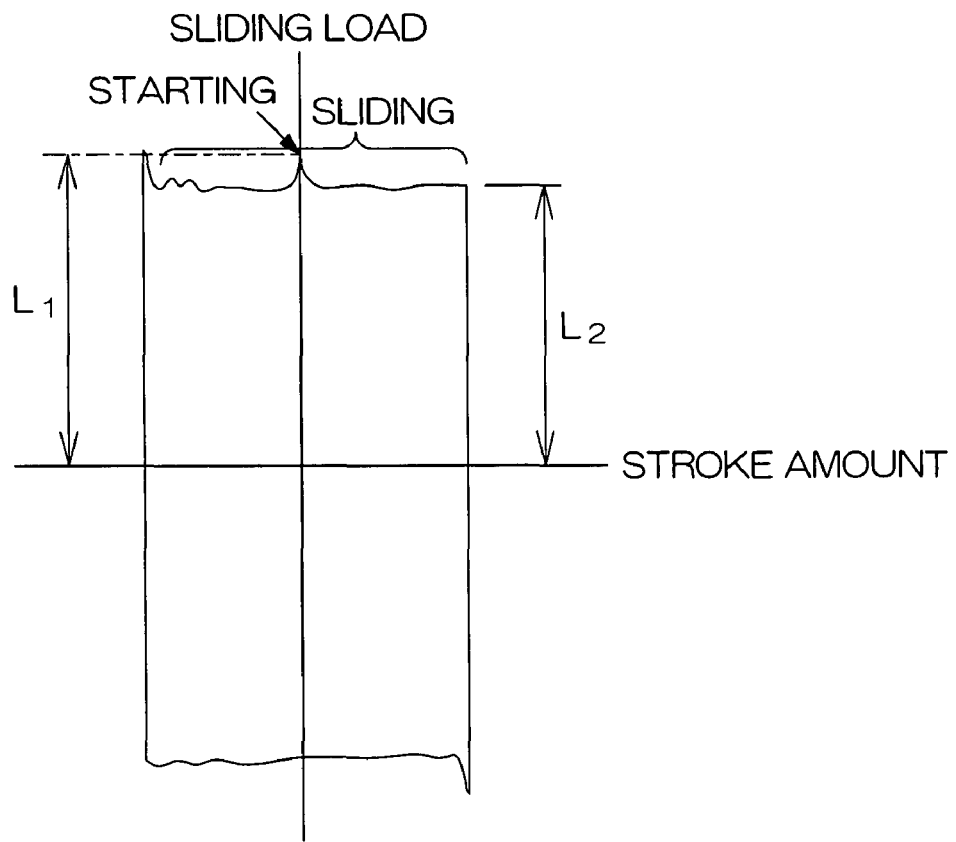
FIG. 5 is a graph showing an example of the relationship between an axial stroke amount of an inner shaft member and a sliding load applied thereto, which is measured using the test device shown in FIG. 4.

When a sliding load applied to the inner shaft member 51 was measured using the torque meter 20 in axially moving the driving shaft 21 back and forth while maintaining a state where a predetermined torsional torque is applied to the meshing portion between the male spline 51a in the inner shaft member 51 and the female spline 52a in the outer shaft member 52 by rotating the torque load member in the test device in one direction around the central axis of the driving shaft 21, a graph can be obtained representing the relationship between an axial stroke amount of the inner shaft member 51 and the sliding load applied thereto, as shown in FIG. 5. From the graph, the magnitude L1 at starting, and the magnitude L2 at sliding, and a waveform at sliding of the sliding load were observed to evaluate each of the following characteristics. The evaluation was carried out with respect to both at the time of forward movement (above the horizontal axis) and backward movement (below the horizontal axis) of the driving shaft 21.

Sliding load (at starting): the lubricant compositions in which the sliding load L1 at starting was not more than 325N was evaluated as good, and the sliding load L1 was more than the above-mentioned range was evaluated as poor.

Sliding load (at sliding): the lubricant compositions in which a difference ΔL between the sliding load L1 at starting and the sliding load L2 at sliding was not more than 45N was evaluated as good, and the difference was more than the above-mentioned range was evaluated as poor.

The presence of stick-slip: the lubricant compositions in which a waveform of the sliding load at sliding exhibited smooth transition having no distortion was evaluated as good, and the waveform was distorted was evaluated as poor.

The results are shown in Table 1.

TABLE 1

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| Kinematic viscosity of base oil (mm$^2$/s at 40° C.) | 1500 | 2054 | 5548 | 7414 | 1000 | 13340 | 3500 | 5000 |
| Thickener | PTFE | PTFE | PTFE | PTFE | PTFE | PTFE | Silica | Li soap |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Consistency | No. 2 | No. 2 | No. 2 | No. 2 | No. 2 | No. 2 | No. 1 | No. 1 |
| Sliding load  Starting | Good | Good | Good | Good | Good | Poor | Good | Good |
| Sliding | Good | Good | Good | Good | Good | Good | Good | Good |
| Stick-slip | Good | Good | Good | Good | Poor | Good | Poor | Poor |

It was found from Table 1 that in the lubricant composition Comparative Example 1 using the base oil having a kinematic viscosity less than 1500 mm$^2$/s at 40° C., stick-slip occurred when a high load was applied thereto irrespective of the fact that a PTFE was used as a thickener. On the other hand, in the lubricant composition in the Comparative Example 2 using the base oil having a kinematic viscosity more than 13000 mm$^2$/s at 40° C., the sliding load L1 at starting is too high. Therefore, in a case where the expandable shaft filled with the lubricant composition was incorporated as an intermediate shaft into the column-type EPS while expanding and contracting the expandable shaft to change the distance between the steering shaft and the steering mechanism, the workability in assembling the column-type EPS into an automobile was presumed to deteriorate. Further, it was fond that in the lubricant compositions in Comparative Examples 3 and 4 each using the base oil having a kinematic viscosity within a range of 1500 to 13000 mm$^2$/s at 40° C. but using a thickener other than the PTFE, stick-slip occurred when a high load was applied thereto.

On the other hand, in all the lubricant compositions in Examples 1 to 5 each using the base oil having a kinematic viscosity within a range of 1500 to 13000 mm$^2$/s at 40° C. and using the PTFE as the thickener, the sliding loads at starting and at sliding were respectively within good ranges. Therefore, it was found that in a case where the expandable shaft filled with the lubricant composition was incorporated as an intermediate shaft into the column-type EPS while expanding and contracting the expandable shaft to change the distance between a steering shaft and a steering mechanism, the workability in assembling the column-type EPS into an automobile was presumed to improve. In each of the lubricant compositions in Examples 1 to 5, it was also confirmed that no stick-slip occurred even if a high load was applied thereto.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A lubricant composition for lubricating an expandable shaft, wherein the lubricant composition consists of:
    poly-α-olefin oil having a kinematic viscosity of 2000 to 7500 mm$^2$/s (40° C.); and
    from 45 to 50% by weight of a thickener consisting of polytetrafluoro-ethylene,
    wherein the lubricant composition has a consistency having an NLGI number of No. 2 to No. 1, and
    wherein the lubricant composition minimizes or eliminates stick-slip due to oil film shortage when a high surface pressure is applied to the expandable shaft.

* * * * *